(12) United States Patent
Georgiou et al.

(10) Patent No.: US 7,917,729 B2
(45) Date of Patent: Mar. 29, 2011

(54) SYSTEM ON CHIP IC WITH SUBSYSTEM OF MULTIPLE PROCESSING CORES SWITCH COUPLED TO NETWORK PROTOCOL DEVICE AND BUS BRIDGE TO LOCAL SYSTEM BUS

(75) Inventors: Christos J. Georgiou, Scarsdale, NY (US); Victor L. Gregurick, Hyde Park, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/757,166

(22) Filed: Jun. 1, 2007

(65) Prior Publication Data
US 2007/0239966 A1 Oct. 11, 2007

Related U.S. Application Data

(62) Division of application No. 10/604,491, filed on Jul. 25, 2003, now Pat. No. 7,353,362.

(51) Int. Cl.
*G06F 15/16* (2006.01)
(52) U.S. Cl. ............... 712/32; 710/306; 712/28; 712/33
(58) Field of Classification Search .................... None
See application file for complete search history.

(56) References Cited

U.S. PATENT DOCUMENTS

| 4,633,394 | A | 12/1986 | Georgiou et al. |
| 4,751,634 | A | 6/1988 | Burrus, Jr. et al. |
| 4,829,511 | A | 5/1989 | Georgiou |
| 4,929,939 | A | 5/1990 | Varma et al. |
| 4,952,930 | A | 8/1990 | Franaszek et al. |
| 5,056,058 | A | 10/1991 | Hirata et al. |
| 5,166,674 | A * | 11/1992 | Baum et al. .................. 714/752 |
| 5,189,314 | A | 2/1993 | Georgiou et al. |
| 5,229,994 | A | 7/1993 | Balzano et al. |
| 5,535,373 | A | 7/1996 | Olnowich |
| 5,586,273 | A | 12/1996 | Blair et al. |

(Continued)

FOREIGN PATENT DOCUMENTS
JP 10-506492 6/1998
(Continued)

OTHER PUBLICATIONS

"Motorola intelligence everywhereTM digital dnaTM", Fact Sheet MPC8560 Powerquicctm Integrated Communications Processor, Motorola, Inc, 2002.

(Continued)

*Primary Examiner* — Kenneth S Kim
(74) *Attorney, Agent, or Firm* — Scully, Scott, Murphy & Presser, P.C.; Joseph P. Abate, Esq.

(57) ABSTRACT

A System-on-Chip (SoC) component comprising a single independent multiprocessor subsystem core including a plurality of multiple processors, each multiple processor having a local memory associated therewith forming a processor cluster; and a switch fabric means connecting each processor cluster within an SoC integrated circuit (IC). The single SoC independent multiprocessor subsystem core is capable of performing multi-threading operation processing for SoC devices when configured as a DSP, coprocessor, Hybrid ASIC, or network processing arrangements. The switch fabric means additionally interconnects a SoC local system bus device with SoC processor components with the independent multiprocessor subsystem core.

8 Claims, 9 Drawing Sheets

U.S. PATENT DOCUMENTS

| | | | |
|---|---|---|---|
| 5,798,918 | A | 8/1998 | Georgiou et al. |
| 5,838,935 | A | 11/1998 | Davis et al. |
| 5,905,873 | A | 5/1999 | Hartmann et al. |
| 5,931,933 | A | 8/1999 | Billheimer et al. |
| 6,032,245 | A | 2/2000 | Georgiou et al. |
| 6,038,630 | A | 3/2000 | Foster et al. |
| 6,055,581 | A | 4/2000 | Berglund et al. |
| 6,215,412 | B1 | 4/2001 | Franaszek et al. |
| 6,260,088 | B1 * | 7/2001 | Gove et al. .............. 710/100 |
| 6,262,594 | B1 | 7/2001 | Cheung et al. |
| 6,331,977 | B1 | 12/2001 | Spaderna et al. |
| 6,385,748 | B1 | 5/2002 | Chen et al. |
| 6,405,289 | B1 * | 6/2002 | Arimilli et al. .............. 711/145 |
| 6,651,131 | B1 * | 11/2003 | Chong et al. .............. 710/317 |
| 6,662,253 | B1 | 12/2003 | Gary et al. |
| 6,678,535 | B1 | 1/2004 | Narayanaswami |
| 6,721,313 | B1 | 4/2004 | Van Duyne |
| 7,093,258 | B1 * | 8/2006 | Miller et al. .............. 718/105 |
| 2001/0042147 | A1 | 11/2001 | Adams et al. |
| 2001/0047465 | A1 | 11/2001 | Liu |
| 2002/0172197 | A1 | 11/2002 | Dale et al. |
| 2002/0176402 | A1 | 11/2002 | Karim |
| 2002/0184419 | A1 | 12/2002 | Creedon et al. |
| 2003/0046492 | A1 | 3/2003 | Gschwind et al. |
| 2003/0067913 | A1 | 4/2003 | Georgiou et al. |
| 2003/0067930 | A1 | 4/2003 | Salapura et al. |
| 2003/0105906 | A1 | 6/2003 | Zhao |

FOREIGN PATENT DOCUMENTS

| | | |
|---|---|---|
| JP | 2001-506781 | 5/2001 |
| WO | WO 97/04401 | 2/1997 |
| WO | WO 98/28695 | 7/1998 |

OTHER PUBLICATIONS

Nair, R. "Effect of increasing chip density on the evolution of computer architectures", IBM J. Res. & Dev., vol. 46, No. 2/3, Mar./May 2002, pp. 223-234.

Berry, "System-On-Chip Markets and Trends", Electronic Trend Publications, Inc. San Jose, CA, Second Edition, 2003, pp. 1-1-5-2.

Almasi, et al., "Dissecting Cyclops: A Detailed Analysis of a Multithreaded Architecture", RC 22243 (98713) Apr. 1, 2002, pp. 1-15.

Georgiou, et al., "A Programmable Scalable Platform for Next Generation Networking", Proceedings of 2nd Network Processor Workshop, NP2, in conjunction with HPCA-9, Feb. 2003, Anaheim, CA, pp. 1-9.

IBM Corporation: "IBM introduces PowerPC 440 embedded processor", http://www-3.ibm.com/chips/news/2003/0922_440ep.html; last printed Sep. 20, 2006; pp. 1-2.

IBM Corporation: "CoreConnect bus architecture", 3.ibm.com/chips/products/coreconnect/; last printed Sep. 20, 2006; pp. 1-2.

ARM: "The Architecture for The Digital World", http://www.arm.com/armtech/cpus?OpenDocument; last printed Sep. 20, 2006; pp. 1-2.

* cited by examiner

PROCESSOR QUAD

32-PROCESSOR SYSTEM

SYSTEM ON CHIP IC WITH SUBSYSTEM OF MULTIPLE PROCESSING CORES SWITCH COUPLED TO NETWORK PROTOCOL DEVICE AND BUS BRIDGE TO LOCAL SYSTEM BUS

RELATED APPLICATIONS

This application is a divisional of U.S. application Ser. No. 10/604,491, filed Jul. 25, 2003.

BACKGROUND OF THE INVENTION

1. Field of the Invention

The present invention relates to network processor devices, and particularly, a system and method for simplifying the design of complex System-on-Chip (SOC) implementations by providing a self-contained processor subsystem as a component for System-on-Chip design.

2. Description of the Prior Art

Current state-of-the-art of building SoCs requires the designer to, inter alia: a) assemble from basic components such as microprocessors, memories, basic I/O macros (e.g., a framer); b) model bus-contention between the different devices, and select appropriate bus structures; c) integrate all components during SoC hardware design; and d) integrate all components using custom software.

However, there are inherent problems with the state-of-the art SoC design methodologies, including, but not limited to: it is labor-intensive; it is error-prone; it requires highly-skilled designers familiar with a particular application domain; it demands high modelling overhead for bus modeling and/or contention on a common system bus; it requires hardware and software integration to provide such basic services as TCP/IP, InfiniBand, FibreChannel, iSCSI and other standardized protocols. An example of a successful SoC integration design approach has been implemented in the MPC8560 Integrated Communications Processor available from Motorola, Inc.

Other approaches to SoC design where multiple sub-systems are integrated on a card or board exhibit problems due to component count which drives system cost, increased failure susceptibility, and the cost of high-interconnect multi-layer boards.

FIGS. 1 and 2 illustrate respective prior art implementations of a Network Processor chip 10 (FIG. 1) and 15 (FIG. 2) each including multiple processing cores 20, local memory, data memory, link memory, CPU, buffers, and PHY (network physical layer) interfaces. These are stand-alone NPU's (Network Processor Units) that do not connect to an "open" system bus via a common macro.

FIG. 3 illustrates a prior art implementation of a Network Processor chip 30 including processors 40, a system bus, cache, and local memory connected through a "bridge" such as the PCI (Peripheral Components Interconnection bus) bridge to a local processor bus commonly used in today's systems.

It would thus be highly desirable to provide an SoC integrated circuit having a multiprocessor subsystem as component and hther a self-contained multiprocessor subsystem having predefined functionality for implementation as an independent SoC component and further, provides multi-threading capability.

Relevant references describing aspects of SoC processor and component design include:

U.S. Pat. No. 6,331,977 describes a System on a chip (SOC) that contains a crossbar switch between several functional I/Os internal to the chip and number of external connection pins, where the number of pins is less than the number of internal I/Os.

U.S. Pat. No. 6,262,594 describes an apparatus and method implementing a crossbar switch for configurable use of group of pads of a system on chip.

U.S. Pat. No. 6,038,630 describes an apparatus and method implementing a crossbar switch for providing shared access control device for integrated system with multiple functional units accessing external structures over multiple data buses.

U.S. patent application No. US2002/0184419 describes an ASIC which enables use of different components for a system on a chip using a common bus system and describes wrappers for functional units with different speed and data width to achieve compatibility with a common bus.

U.S. patent application No. US2002/0176402 describes an octagonal interconnection network for linking functional units on a SoC. The functional units on the interconnection network are organized as a ring and use several crossing data links coupling halfway components.

U.S. patent application No. US2001/0042147 describes a system resource router for SOC interconnection, comprising two channel sockets with connect each data cache (D-cache) and instruction (I-cache). Also included are external data transfer initiators, two internal M-channel buses, and an M-channel controller to provide the interconnection.

U.S. patent application No. US2002/0172197 describes a communication system connecting multiple transmitting and receiving devices via a crossbar switch embedded on a chip in a point-to-point fashion.

U.S. patent application No. US2001/0047465 describes several variations of an invention providing a scalable architecture for a communication system (typically a SOC or ASIC) for minimizing total gates by dividing transmissions into individual transmission tasks, determining a computational complexity for each transmission task and computational complexity being based on the number of MIPS per circuit.

In the reference entitled "On-Chip Interconnects for Next Generation System-on-Chips" by A. Brinkmann, J. C. Niemann, I. Hehemann, D. Langen, M. Porrmann, and U. Ruckert, Conf. Proceedings of ASIC2003, Sep. 26-27, 2003, Rochester, N.Y., there is described an SoC architecture utilizing active switch boxes to connect processor cells for enabling packet network communications. This paper makes no mention or description of a processor core with multi-threading capability.

In the reference entitled "A Comparison of Five Different Multiprocessor SoC Bus Architectures" by Kyeong Keol Ryu, Eung Shin, and Vincent J. Mooney, Conf. proceedings of Euromicro Symposium on Digital System Design (DSS'01), Sep. 4-06, 2001, Warsaw, Poland, there is described Multiprocessor SoC bus architectures including Global Bus I Architecture (GBIA), Global Bus II Architecture (GBIIA), Bi-FIFO Bus Architecture (BFBA), Crossbar Switch Bus Architecture (CSBA), and CoreConnect Bus Architecture (CCBA).

None of the prior art configurations teach a processor core that comprises multiple sub-processors (thread groups) each with locally connecting SRAM or eDRAM m a multithreading configuration in order to improve processor performance and further SOC, ASIC, NP, or DSP integration.

SUMMARY OF THE INVENTION

It is an object of the present invention to provide a self-contained multiprocessor subsystem component functioning as a specially programmed component capable of performing multi-threading operations in an SoC integrated circuit.

In the present invention, a self-contained multiprocessor (MP) component includes sub-processor cores each containing local memory (e.g., SRAM) in order to enable a multi-threading processor core as a component in SoC design. Additionally included in the self-contained multiprocessor component is a local interconnect medium such as a crossbar switch (or similar type switch design) that connects to a single local processor bus of the SoC integrated circuit. The SoC IC may be configured as an advanced microprocessor, DSP (Digital Signal Processor), coprocessor, Hybrid ASIC, network processor (NP) or other like processor arrangement ASIC. Such an SoC integrated circuit having the self-contained multiprocessor subsystem component provides multi-threading capability whereby a sub-processor core (thread unit) operates independent of other threads by allowing program code and data from one context to remain independent from other contexts. The crossbar switch further enables communication with the rest of the chip via well-defined hardware and software interfaces.

In another aspect of the invention, the self-contained multiprocessor (MP) component as a component in SoC ASIC design is available as a ready made multi-threading processor core with appropriate software for a specific use. The NIP component is connected to other components using a standardized interface such as a Processor Local Bus (PLB) adapter that bridges the local interconnect medium with a standardized ASIC methodology bus, such as CoreConnect-PLB bus, or any other on-chip bus or bus protocol.

The self-contained multiprocessor (MP) component providing multi-threading operations of the present invention not only improves processor speed, but reduces off-chip access times, significantly reduces cache latency, and improves instruction and data packet processing. Via a software polling technique that is easily reconfigurable, the processor core may be adapted for different communication protocols (Fibre Channel, Ethernet, IPsec, ATM, Ipv6, etc).

In another aspect of the invention, the multi-processor core includes polling software that enables the MP core to connect with the local processor bus and/or a common media interface MAC's such as Ethernet, Fibre Channel, iSCSI, etc. This enables more efficient data processing, reusable core design, protocol independent core design, and multiple numbers of system processing cores attached to a common processor bus for higher levels of SoC performance. When configured as SoC microprocessor designs the common bus-attached multi-processor enhances performance (faster speed, lower latency, drastically improved cache performance and/or even the elimination of off-chip cache or memory off-loads all together, except external storage, and requests). As processor speed increases (e.g., greater than 2 GHz-10 GHz), the invention provides a most effective way to utilize the common microprocessor speed and memory cache bottleneck found in today's PC and workstation computer designs.

Advantageously, the present SoC design of the invention may be implemented for applications and uses including, but not limited to: IPSec VPN (Virtual Private Networks) tunneling engine; TCP/IP Offload Engine; Network processing for iSCSI; Multimedia processing, e.g., MPEG en/de-coding, sound/voice/video processing, Encryption engine, Compression/decompression engine, etc.

BRIEF DESCRIPTION OF THE DRAWINGS

Further features, aspects and advantages of the apparatus and methods of the present invention will become better understood with regard to the following description, appended claims, and the accompanying drawings where:

DETAILED DESCRIPTION OF THE PREFERRED EMBODIMENT

Multiprocessor systems-on-a-chip consist of multiple instances of different components: (i) functional units; (ii) memory (including cache and main memory); and (iii) interconnection. Design choices include both the relative and absolute numbers of components, their particular features, and their placement with respect to each other.

Figure 1:
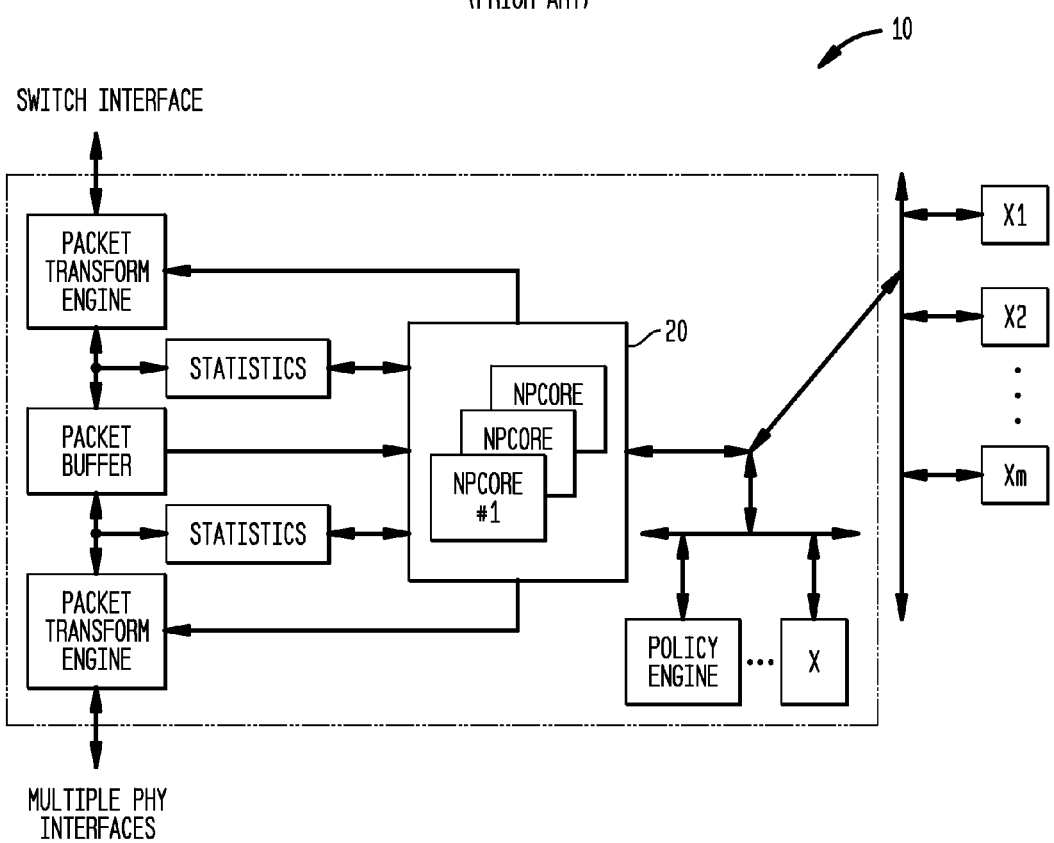
FIGS. 1-3 illustrate various prior art implementations of a Network Processor chip including multiple processing cores, memory and interfaces according to the prior art.
Figure 2:
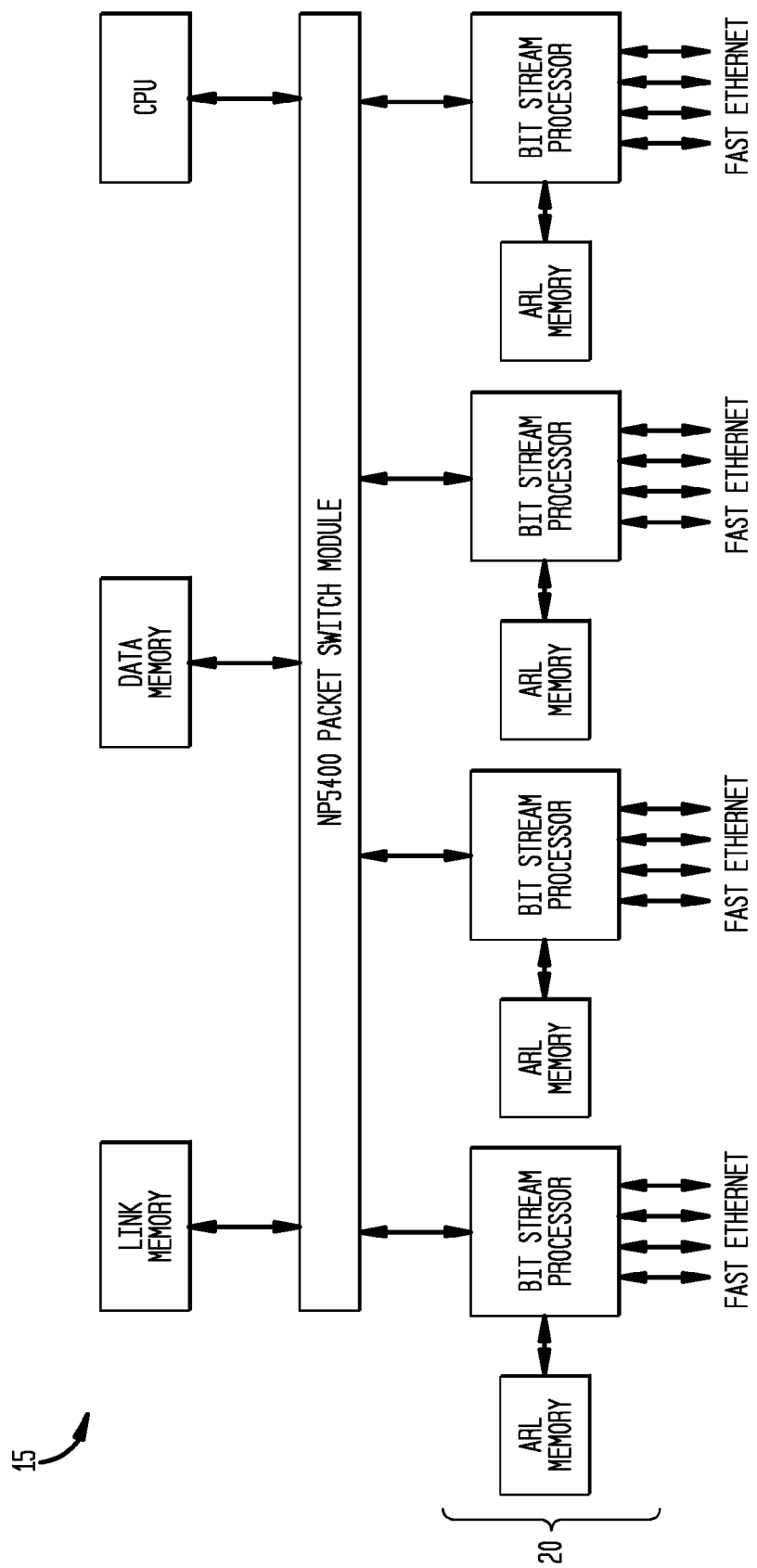
Figure 3:
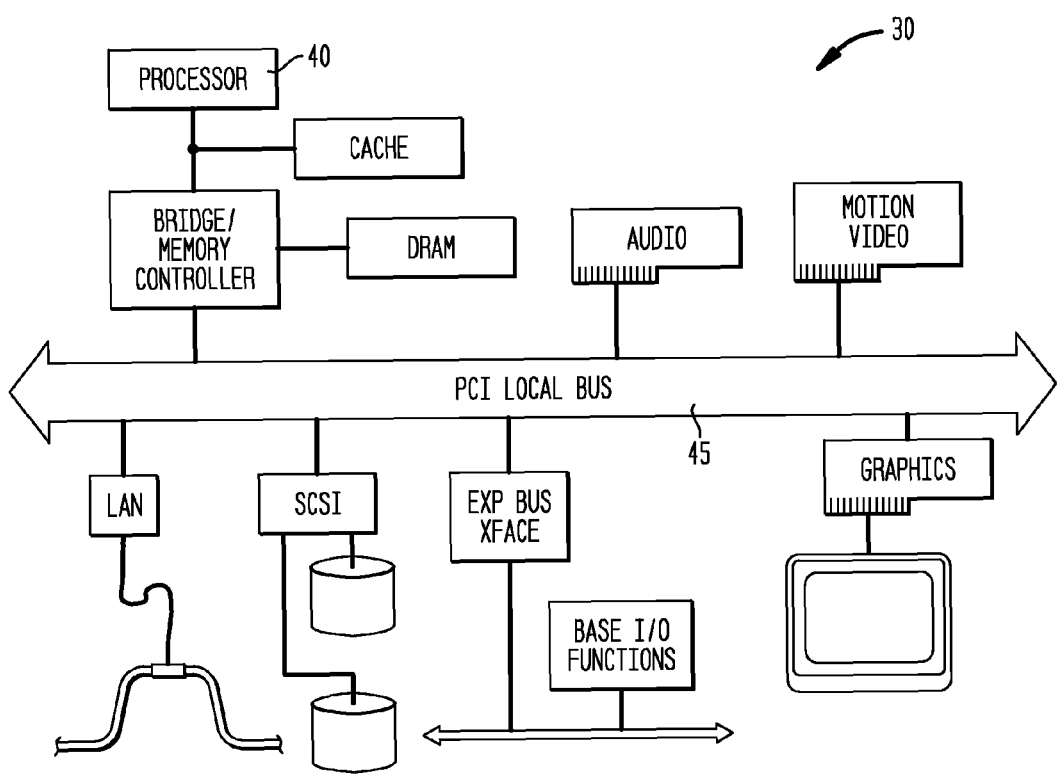
Figure 4A:
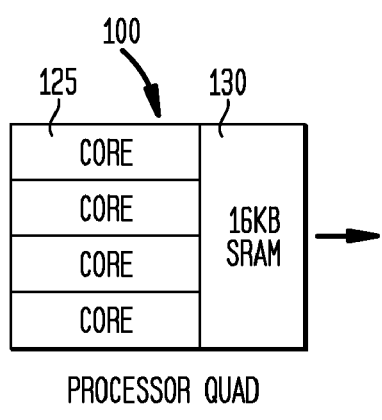
FIG. 4 depicts an exemplary Processor Core used in a preferred embodiment of the present invention.
Figure 4B:
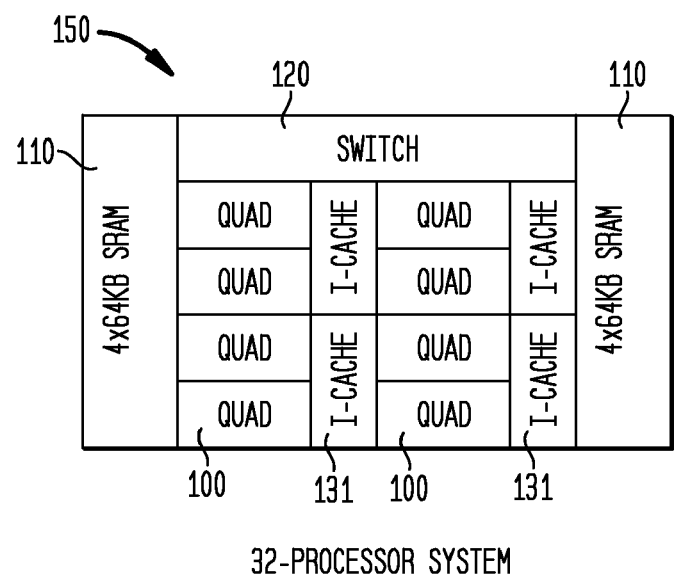

FIG. 4(b) depicts an exemplary self-contained processor-based subsystem 150 as a component for multiprocessor system on chip design according to the invention. In the example depicted in FIG. 40b) the self-contained processor-based subsystem 150 comprises a plurality of processor units 100, a shared memory such as provided by an SRAM memory 110 and a switch fabric 120. As shown in FIG. 4(a), each processor unit 100 comprises a plurality of individual processor cores 125, for example, four (4) processing cores 125 comprising a processing unit or "Quad" 100 as depicted in FIG. 4(a) with each processor core 125 comprising an execution unit or processor device, and connected with a common local (private) memory depicted as SRAM 130, e.g., providing 16 KBytes of memory.

In one embodiment, the self-contained processor-based subsystem 150 depicted in FIG. 4(b) is based on a multi-threaded architecture chip design developed by the assignee of the present invention International Business Machines Corporation. (IBM), referred to herein as "Cyclops" and described in detail in the reference to C. J. Georgiou, et al. entitled "A programmable scalable platform for next generation networking," Proceedings of Workshop on Network Processors, Feb. 8-9, 2002, Anaheim, Calif. A single Cyclops chip may comprise a large number (typically hundreds) of simple thread execution units, each one simultaneously executing an independent stream of instructions. The performance of each individual thread is such that the aggregate chip performance is much better than conventional designs with an equivalent number of transistors. Cyclops uses a processor-in-memory (PIm) design where main memory and processing logic are combined (self-contained) into a single piece of silicon. Large, scalable systems are built with a cellular approach using Cyclops as a building block, with the cells interconnected in a regular pattern through communication links provided in each chip.

Figure 5:
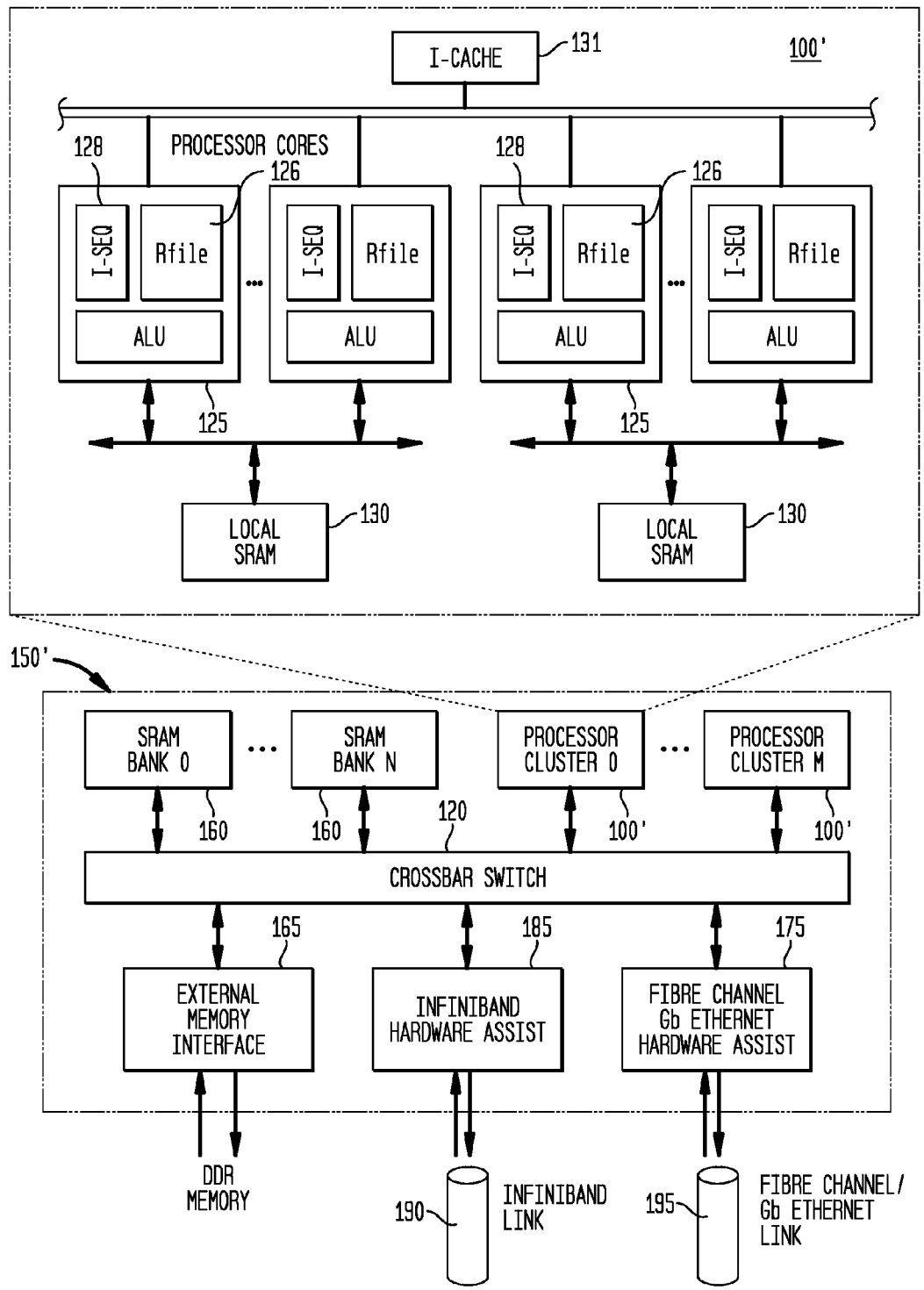
FIG. 5 depicts an exemplary overview of a multiprocessor subsystem implementing functionality according to a preferred embodiment of the invention.

In a preferred embodiment shown in FIG. 4(b), in the Cyclops design depicted for networking applications, there are eight (8) processor units or "Quads" 100 included with each Quad further connected with internal memory to the embedded shared memory (SRAM) 110 and connected to an on-chip switch fabric 120 which may be an on-chip cross bar switch, or a packet switch fabric, etc. Thus, in one embodiment, the self-contained processor-based subsystem 150 component provides 32 threads of execution, up to 128 kB of local RAM 130 and 512 KByte of shared SRAM 110. It is understood that other designs are possible including 64-bit high-end versions for scientific/engineering applications. In this design, many processing tasks may be broken down into many threads, running concurrently, to provide true multi-threading capability. More particularly, as shown in FIG. 5, the multiprocessing approach adopted by in the Cyclops architecture, includes many simple cores 125 forming a processor cluster 100' each with a reduced, but general purpose, instruction set of about 40 RISC-like instructions. As shown in FIG. 5, each processor core 125 of a cluster 100' has its own register file 126, arithmetic logic unit (ALU) 127, and instruction sequencer 128. In the embodiment depicted, the processor cores 125 have a single-issue architecture with a simple, four stages deep pipeline. Four cores share a local SRAM 130, for storing their stack and local variables, and parts of packets that need to be processed, such as header fields, and may function effectively as an information "cache" device although without any of the usual attributes of a processor data cache. In the embodiment depicted, two four-processor clusters 100' share an instruction cache (I-cache) 131 having a bandwidth for the processors 125 sufficient to prevent instruction starvation and accommodating most working sets of the processor without causing cache trashing and increased instruction miss rate. It is understood that each processor core 125 comprises a thread group and may be connected via the I-cache 131 in order to perform in a multi-threading capability. The more sub-processors (thread groups) the better the overall processor core will operate in terms of faster processor cycle time and reduced cache demands/latency. Exemplary embodiments target 2-256 sub-processor groups, with a preferred embodiment of 32 as described herein. However, it is understood that the present invention thus provides true simultaneous, multi-threading, multi-processor design, not limited by the number of sub-processors.

The small instruction set and simplicity of features allow the processor cores to be of minimal size delivering a high ratio of MIPS/mm$^2$ of silicon area. This makes possible the placement of many cores on a chip of a rather small footprint to exploit thread-level parallelism. Thus, the present invention may be advantageously applied to enable higher integration/board density for lower card assembly cost; and provide enhanced scalability for larger bandwidth applications and processing cores as it is a true "System-On-A-Chip" implementation, allowing for multiple "cores" for plug-n-play system design, enabling greater architecture flexibility. It is understood however, that the processor core is not scalable to reduce gate or transistor counts based on transmission tasks, or computational load, but rather is a fixed design depending upon the application/targeted market. Further, the multiprocessor or subsystem core does not break down tasks and assign them to a DSP or ASIC functional blocks, rather the program code and data packets are processed in multiple subprocessors (thread groups) each with an equivalent memory (e.g., 16 kB SRAM for the data cache) and circuits (ALU, register file, etc). These sub-processors within the thread groups, form thread units, which comprise the processor core as a whole attached to the local system or on-chip local bus (for SOC applications).

In the present invention, each local processor (thread groups, which in turn contain multiple thread units or further sub-processors) are arranged in a cellular organization, such that each processor has N banks of symmetrical on-chip memory (examples: 256 KB SRAM in 4×64 KB, or 4 or 8 MB eDRAM in n×512 KB blocks), each bank being addressable to each local processor group (thread group) via the crossbar switch. The separate on-chip memory of either SRAM or eDRAM is provided to handle continuous address space to all the sub-processor cores (or thread groups). The integrated 16 KB SRAM memory (one per thread group) is accessible by all the processor threads on the chip.

Figure 10:
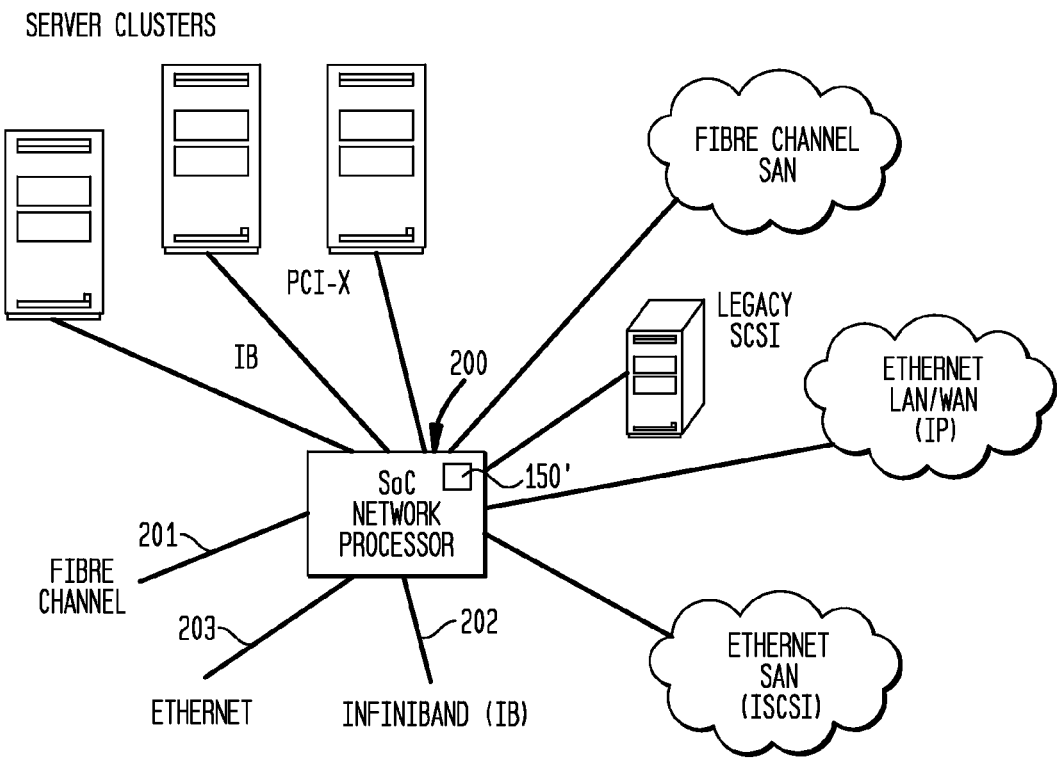

In the more detailed view of FIGS. 5 and 10, the multiprocessor SoC design according to the invention comprises a storage area network (SAN) processor architecture 150' capable of handling network packet communications functions according, but not limited to the following protocols: Fibre Channel 201, Infiniband 202 and Gb Ethernet 203. As shown in FIG. 5, the network processor SoC design 150' includes embedded banks of memory 160 for storing data packets, connection information, and programs. Usage of embedded memory (SRAM or DRAM) is advantageous, as significant amounts of memory may be placed on a chip without excessively increasing its size. In addition, embedded memory has short and predictable access times, which can be accounted for in the time budget for the processing of single packets and offers significant performance advantages as compared to conventional off-chip memory as the overall traffic is reduced on the internal interconnect, resulting in fewer resource collisions, reduced performance degradation and power consumption. In addition to storing data, current control, status, and routing information in the embedded memory 160 is maintained. As some applications may require memory requirements exceeding the available on-chip memory, the SoC network processor architecture employs off-chip DRAM (not shown) connected via a high-bandwidth DDR memory interface 165. The external DRAM may store statistics, archival information, as well as provide congestion buffering.

In the SoC network processor 150' of FIG. 5, most of network communications protocol functions are implemented programmatically. However, highly time-critical functions at the lower level of the network protocol are implemented via hardware accelerators. Hardware accelerators handle low-level protocol tasks, such as data encoding/decoding, serialization/deserialization, link management, and CRC and checksum calculation. These tasks are performed on every byte of the transferred packets and would be very computation expensive if implemented in software. The hardware implementation of these functions are thus provided as hardware accelerators implemented in network interfaces 175 for Fibre Channel and Gigabit Ethernet, and a network interface 185 for Infiniband, each requiring only a small silicon area and interfacing with respective Infiniband and Fibre Channel communication links 190, 195.

Further as shown in FIG. 5, the SoC network processor design 150' includes an internal interconnect comprising a crossbar switch 120 that interconnects processor clusters 100', shared memory blocks 160, an external memory interface 165 for external DRAM memory access, and network protocol layer hardware assist devices 175, 185. In an exemplary embodiment, the crossbar switch 120 has 64-bit data paths and provides several words worth of pipelining and token signaling to avoid data overflows. The processor Quad share a port to the crossbar 120, so a crossbar with 16-ports, for example, is sufficient to interconnect up to a 32-processor system. It is understood however, that the crossbar switch 120 may be replaced with a pseudo-crossbar, a bus, a switch, or other such interconnect as may be appropriate, as will be described herein with respect to FIG. 8.

As mentioned generally herein, the SoC network processor architecture is cellular, i.e., it enables the design to be custom scaled depending on the application requirements. For example, endpoint functionality of the Fibre Channel requires less computational power than the more complex TCP/IP termination with iSCSI protocol conversion to Infiniband. In the present invention however, the number of processor cores or clusters 100' and embedded memory blocks may be easily adapted to the application requirements without making significant design changes.

Figure 6:
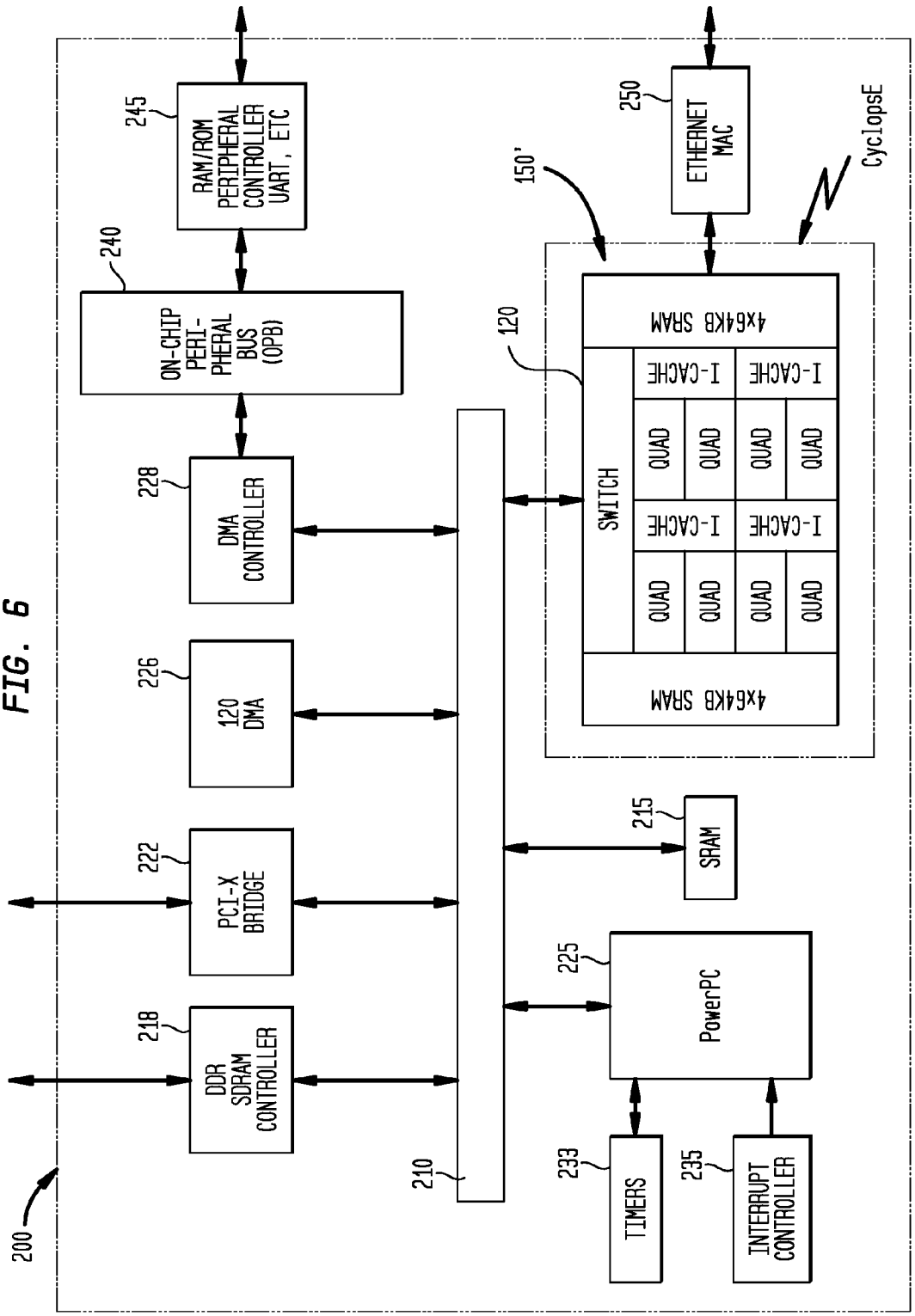
FIG. 6 depicts a further embodiment of a Network Attached Processor employing the SoC subsystem of FIG. 4(b) according to a second embodiment of the invention.

FIG. 6 depicts a first embodiment of an SoC Network Attached Processor 200 employing the self-contained multi-processor subsystem 150' of FIGS. 5 and 10. The CyclopsE available from assignee IBM, is one possibility for use as the subsystem 150'. In the embodiment of FIG. 6, the subsystem 150' is connected to a processor local bus 210 which may comprise, e.g., a SoC standardized processor-local bus (PLB) such as ARM AMBA (Advanced Microcontroller Bus Architecture), MIPs (Microprocessor Interface Program), the open standard CoreConnect, AHB (Advanced High-Performance Bus), etc. via a common macro (e.g., a PLB connector macro), enabling a true plug-n-play system on a chip (SOC) to a multi-source bus architecture.

It should be understood that the embodiment of the Network Attached Processor 200 depicted in FIGS. 6 and 10 implements a PowerPC or other like processor 225 for providing computational capability in the SoC subsystem. Equivalently, a PPC440 may be replaced with another PPC core, a MIPS core, or other such microprocessor as selected by SoC integrator Likewise, other components depicted in the FIG. 6 including SRAM 215, DDR controller 218, PCI-X bridge 222, direct memory access DMA device 226 DMA controller 228, on-chip peripheral bus (OPB) 240 for interfacing with external components via one or more I/O interface devices 245. A Medium Access Control (MAC) protocol device 250 is additionally employed to provide the data link layer for an Ethernet LAN system, processor core timers 233 and interrupt controller 235 may be present or omitted in accordance with selections made by architect/integrator of a specific SoC.

Figure 7:
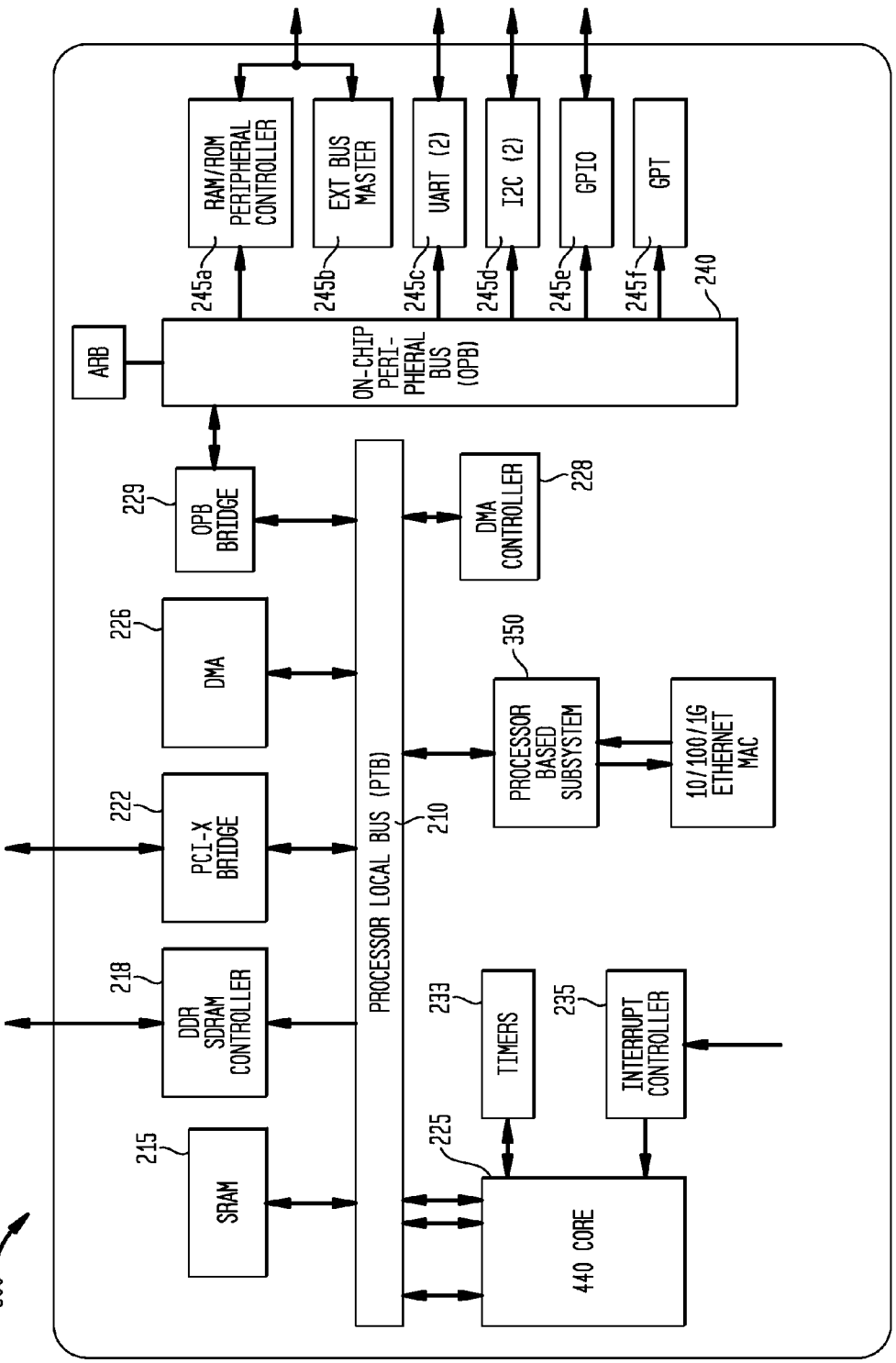
FIG. 7 depicts an SoC employing processor-based subsystem according to a further embodiment of the invention.

FIG. 7 illustrates a second embodiment of the System-on-Chip (SoC) network attached multiprocessing system 300 according to the invention. As in FIG. 6, the SoC multiprocessing system 300 of FIG. 7 comprises the processor (e.g., a 440 core), a local processor bus (PLB) 210, on-chip peripheral bus (OPB), and a number of components, such as SRAM, DDR controller, PCI-X bridge, and DMA controller, however includes an OPB bridge 229 interfacing with the OPB bus 240. The processor bus or PLB 210 is a SoC standardized processor local bus such as AMBA, MIPs, CoreConnect PLB, AHB, etc. One of the components connected to the PLB 210 is a processor based subsystem 350 described in greater detail hereinbelow with respect to FIG. 8. The elements depicted in FIG. 7 are exemplary and non-limiting. For example, PPC440 can be replaced with another PPC core like PPC 405 or PPC440, or ARM or MIPS processor cores, or other such microprocessor as selected by SoC integrator or may include completely novel cores without limiting the main scope of this invention. Likewise, other components listed here (or any other component from the SoC library) may be present or omitted in accordance with selections made by architect/integrator of a specific SoC. For instance, as shown in FIG. 7, devices provided for interfacing with the On-chip Peripheral bus 240 may include, but is not limited, one or more of the following: a RAM/ROM Peripheral controller 245*a*, an external bus master 245*b*, a UART device 245*c*, an Inter-IC bus (I2C) interface 245*d*, general purpose I/O interface 245*e* and a gateway interface 245*f*. Thus it is understood that there is enabled multiple-chip configurations.

Figure 8:
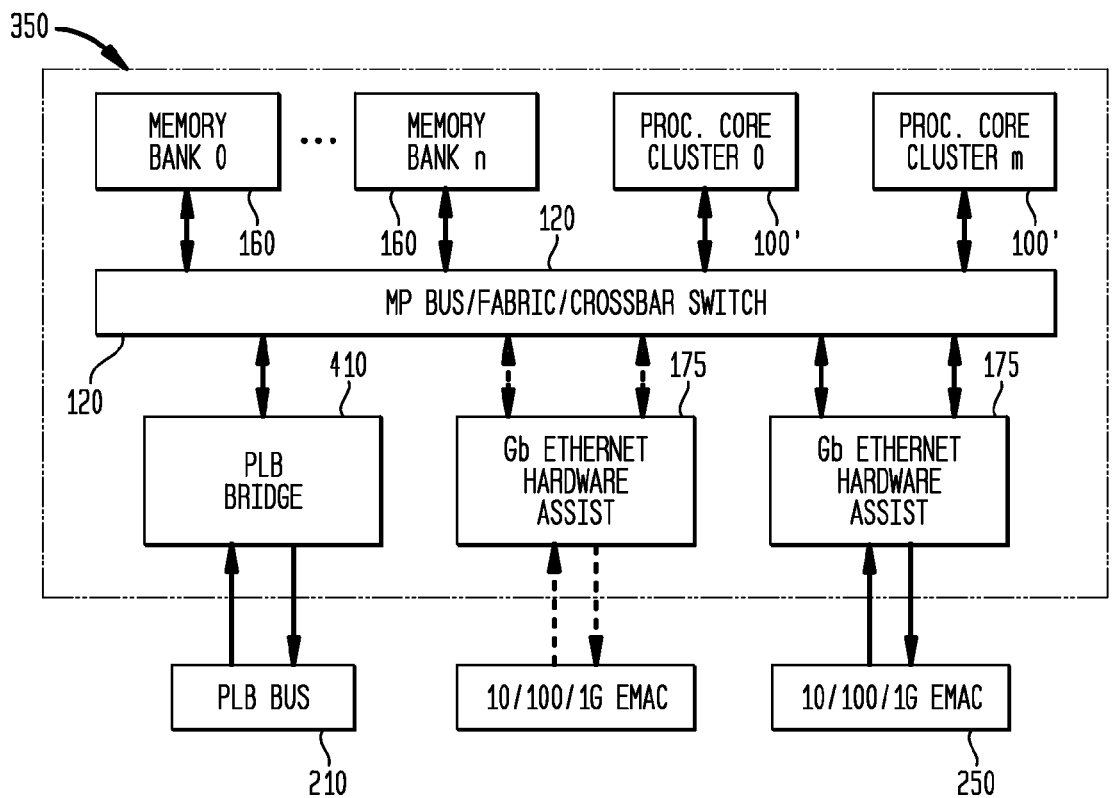
FIG. 8 depicts an SoC multiprocessor subsystem according to a further embodiment of the invention.

FIG. 8 depicts a self-contained processor-based subsystem 350 according to further embodiment of the invention. This subsystem is integrated as a component in a SoC network attached processor system such as depicted in FIGS. 6 and 7 and is connected to a processor bus 210 via a PLB bridge which can be a common macro in the ASIC library. The processor based subsystem 350 comprises one or multiple processor clusters such as the processor cluster 100' of FIG. 5, one or more local memory cells for storing data and/or instructions and local interconnect means implemented as a separate bus, fabric, crossbar switch or other interconnect means 120. In the preferred embodiment, the multiprocessor subsystem 350 comprises a PLB bridge macro component 410 for communicating over the SoC network processor bus 210, however it is understood that any other bridging macro can be selected to enable data flow between the processor based subsystem 350 and the SoC bus 210. The processor bus 210 is a separate bus, switch or interconnect means used in System-on-Chip assembly for connecting a processor and components.

Separation of the subsystem and the processor buses 210 (FIGS. 6 and 7) is advantageous in that: 1) subsystem traffic is separated from the PLB traffic, avoiding bandwidth contention; 2) only traffic between the subsystem and the SoC system on global standardized bus is the interface traffic (data receive and send); 3) the subsystem bus/switch interconnect fabric is designed to offer optimized MP fabric for implementing high performance solution, without requirement to accommodate standardized components and connection protocols in a SoC system. In this way, a SoC solution may benefit from both worlds: the multiprocessor (MP) fabric can be optimized for MP high performance, and all the standard existing components from the SoC library can be used.

Figure 9:
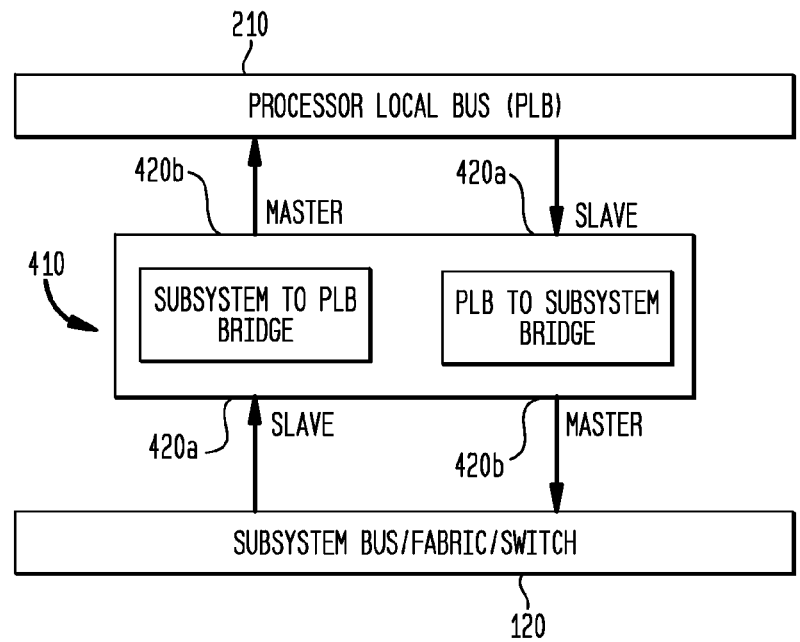
FIG. 9 depicts a possible implementation of a bridge component provided in the system of FIG. 8; and, FIG. 10 depicts one exemplary Network Processor arrangement 200 implementing the independent multiprocessor core 150' according to the invention.

The subsystem 350 including interconnecting bus/switch/fabric 120 is particularly connected to a processor bus 210 using abridging component 410 which adapts for different speeds, data widths, signals and signaling protocols between two communication systems, in the way existing bridges perform, e.g., PLB-to-OPB bridge, or PLB-to-PCI-X. Implementing an interface to a standardized processor local interconnect such as PLB or AMBA enables integration of this new component into SoC component library. A possible implementation of this bridge component 410 is shown in FIG. 9. The purpose of this bridge macro 410 is to translate/adjust control signals, data width, operating frequency and address space between the SoC processor bus 210 and the processor based subsystem local bus 120. Preferably, bridge macro component 410 implements data buffering for data coming to and out of the processor-based subsystem module, and may include DMA controllers for subsystem and PLB. The configuration and status registers may be implemented as memory-mapped registers in the subsystem address space. The configuration registers are set by the processor-based subsystem 350, and it also reads the status of the bridge 410. This module can also include settings to select between various data width on the SoC processor bus (e.g., to set operation mode to work with 64 or 128 PLB), and/or to support various modes of operation, e.g., line and burst data transfers. The SoC address space and the subsystem address spaces may, but not necessarily have to share the same address space.

The bridge macro 410 of FIG. 9 particularly functions on the PLB bus as a PLB slave 420a and as a PLB master 420b. As a PLB slave, it implements read and write requests from the SoC processor for getting a piece of data from the processor based subsystem 350. During a read request for a data in the memory in the processor based subsystem, the bridge receives a read request from the PLB 210, resolves address and generates read request for the processor based subsystem bus/fabric/switch 120. It buffers read data from the processor-based subsystem 350, and transfers data to the PLB 210 in the width and speed specified by the PLB bus 210. During a write request for a data in the memory in the processor based subsystem, the bridge buffers data from PLB 210 for write request, resolves address for the memory bank in the processor-based subsystem, and transfers data to the proper memory bank in the processor-based subsystem 350, as specified by its bus/fabric/switch 120.

Conversely, when functioning as a PLB master 420b, it can but must not implement a DMA controller for transferring data from and to the processor-based subsystem. In transferring data by the DMA controller from the processor-based subsystem to the DDR memory of the SoC, the controller sets address and signaling for PLB write request, and then transfers data to the DDR memory. During the DMA transfer of data from the DDR to the processor-based subsystem, the macro sets address and signaling for PLB read request, buffers data, and transfers data to the memory bank in the processor-based subsystem.

In the preferred embodiment, the processor based subsystem 350 comprises an embedded software providing ready-made functionality (personalization) for a specific set of functions. Possible use are network protocol conversion of one network protocol to another, protocol traffic termination, like TCP/IP offload engine, IPSec VPN tunneling engine, network processing for iSCSI, encryption engine, compression/decompression engine, or for multimedia processing, like MPEG en/de-coding, or sound/voice/video processing.

As an illustration of data flow in the processor-based subsystem, a possible implementation of TCP/IP offload engine using the processor-based subsystem 350 of FIG. 8 and SoC architecture of FIGS. 6 and/or 7 is now described as follows:
 the SoC processor core 225 (e.g., PPC440) sets request for data processing and sends the request and the pointer to the data in the DDR memory to the processor-based subsystem 350 via the bridge 410. This can be inplemented as raising an interrupt signal, or writing data to a dedicated register (not shown) or pre-specified memory location, which is regularly polled;
 the processor-based subsystem 350 recognizes this request and activates the DMA engine 226 (FIG. 7) to transfer data from the SoC memory to the memory in the processor-based subsystem;
 data are transferred to the memory in the processor-based subsystem 350, and end of data is signaled;
 the processor based subsystem 350 implements specified protocol tasks, such as TCP/IP protocol—partitions data to series of packets, generates proper headers for packets, etc., and transmits the data to the Ethernet MAC (Media Access Control) network interface circuit. It retransmits packets if needed, as defined by the protocol without the interference from the SoC processor 300;
 once all data are transmitted, the SoC processor 300 is notified about the task completion. This can be implemented as sending an interrupt to the PPC, or writing to some predefined location which is regularly polled by the SoC processor.

What follows is example subsystem code in a preferred embodiment for routing a received packet according to one or more network protocols:

```
for (;;)
{
    poll MAC;
    if (packet received)
        process packet in accordance with protocol
        if (packet successfully received)
            transfer packet via PLB bridge
            cause notification event to CoreConnect bus master
    poll PLB bridge status;
    if (request)
        process request
        if (packet should be transmitted)
            transfer packet via MAC
}
```

While the data flow in the processor-based subsystem is performed via software polling, e.g., between the Media I/O (MAC) device and processor local bus (PLB), it should be understood that the connection is protocol independent, and multiple network protocol types (Ethernet, Fibre Channel, IPv6, ATM, IPsec, HIPPI, etc) may be supported over the same connection lines. The software polling and connection mechanisms are provided to direct bus and I/O media connections provides further benefits and enhances the features of the present invention including the parallelism, and pipelining structure to identify when a packet of data has been successfully processed regardless of media type or origin.

While the invention has been particularly shown and described with respect to illustrative and preformed embodiments thereof it will be understood by those skilled in the art that the foregoing and other changes in form and details may be made therein without departing from the spirit and scope of the invention which should be limited only by the scope of the appended claims.

Having thus described our invention, what we claim as new, and desire to secure by letters patent is:

1. A system-on-chip (SoC) processor Integrated Circuit (IC) architecture comprising:
 a first processor core for controlling SoC processing functions among a plurality of SoC component devices, said first processor core having an associated memory;
 an SoC local system bus device for enabling communications among said SoC component devices and said associated memory, one SoC component device comprising a single self-contained multiprocessor subsystem core comprising:
  a plurality of sub-system processing cores, each core having a processor, each sub-system processor of said plurality operable for providing concurrently running thread operations dedicated to processing a specific network signal processing task according to a network communications protocol,
  a shared local memory;
  a switch fabric means connecting each sub-system processing core and said shared memory within said self-contained_multiprocessor subsystem core; and,
  a network protocol hardware assist device connected to said switch fabric means, said hardware assist device for receiving packets of a particular network communications protocol and forwarding said packets to a sub-system processing core via said switch fabric means; and, a bus bridge device connecting said SoC local system bus device and said switch fabric means, said bus bridge device adapting data for communication between a SoC component device via said SoC local system bus device and to a sub-system processing core via said switch fabric means.

2. The system-on-chip (SoC) processor Integrated Circuit (IC) architecture as claimed in claim 1, wherein said self-contained multiprocessor subsystem core comprising a plurality of multiple processors implements predefined set of functionality for use as a functional SoC component, said switch fabric connecting each processor within said SoC IC enabling data traffic flow for processing required by said functionality within said core.

3. The system-on-chip (SoC) processor Integrated Circuit (IC) architecture as claimed in claim 1, wherein said switch fabric means further enables communication of data traffic and instruction traffic for processing required by said functionality within said core.

4. The system-on-chip (SoC) processor Integrated Circuit (IC) architecture as claimed in claim 1, wherein said switch fabric means comprises a crossbar switch that organizes independent thread groups within the multiprocessor subsystem core in a cellular fashion.

5. The system-on-chip (SoC) processor Integrated Circuit (IC) architecture as claimed in claim 4, wherein each of said plurality of sub-system processing cores includes a local SRAM memory, one of an arithmetic logic unit (ALU) or floating point unit (FPU) and corresponding data cache, and, an instruction cache (I-cache) for connecting processor thread groups together.

6. The system-on-chip (SoC) processor Integrated Circuit (IC) architecture as claimed in claim 4, wherein said self-contained multiprocessor subsystem core functions in an SoC implementation including one of a microprocessor, DSP, coprocessor, Hybrid ASIC's, or another network processor arrangement.

7. The system-on-chip (SoC) processor Integrated Circuit (IC) architecture as claimed in claim 4, wherein the associated local memory of the processor cluster includes a local SRAM, or on-chip DRAM.

8. The system-on-chip (SoC) processor Integrated Circuit (IC) architecture as claimed in claim 4, wherein said first processor core for controlling SoC processing functions directs bus and I/O media connections, said first processor core polling said SoC local system bus device to handle one or more network protocols.

\* \* \* \* \*